(12) United States Patent
Kusaka et al.

(10) Patent No.: US 6,203,062 B1
(45) Date of Patent: Mar. 20, 2001

(54) METHOD OF FOLDING AIR BAG

(75) Inventors: Shuji Kusaka; Tadayuki Ato, both of Shiga (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/268,664

(22) Filed: Mar. 16, 1999

(30) Foreign Application Priority Data

Mar. 25, 1998 (JP) .................................................. 10-095182

(51) Int. Cl.⁷ .................................................. B60R 21/16
(52) U.S. Cl. ..................................... 280/743.1; 280/728.1
(58) Field of Search .......................... 280/743.1, 728.1, 280/731, 777, 801.1

(56) References Cited

U.S. PATENT DOCUMENTS

| | | |
|---|---|---|
| 4,334,828 | 1/1977 | Sogabe et al. . |
| 5,520,408 * | 5/1996 | Niederman ......................... 280/743.1 |
| 5,547,218 * | 8/1996 | Kuretake et al. ................... 280/743.1 |
| 5,681,052 | 10/1997 | Ricks et al. . |
| 5,794,974 * | 8/1998 | Niederman et al. .............. 280/743.1 |
| 5,855,393 * | 1/1999 | Keshavaraj ........................ 280/743.1 |
| 5,865,466 * | 2/1999 | Yamamoto et al. .............. 280/743.1 |
| 5,899,490 * | 5/1999 | Wipasuramonton et al. ..... 280/743.1 |

FOREIGN PATENT DOCUMENTS

| | | |
|---|---|---|
| 25 36 933 | 3/1976 | (DE) . |
| 198 30 299 | 1/1999 | (DE) . |
| 07-277125 | 10/1995 | (JP) . |
| 9-48308 * | 2/1997 | (JP) . |
| 09-263204 | 10/1997 | (JP) . |
| 9-309395 * | 12/1997 | (JP) . |
| 10-230806 * | 2/1998 | (JP) . |
| 10-44900 | 2/1998 | (JP) . |
| WO 98/23468 * | 6/1998 | (WO) . |

* cited by examiner

*Primary Examiner*—Lanna Mai
*Assistant Examiner*—Ruth Ilan
(74) *Attorney, Agent, or Firm*—Kanesaka & Takeuchi

(57) ABSTRACT

In folding an air bag, the air bag is folded in a first direction and a counter first direction to form a loosing portion in a center area of the air bag at a side opposite to the occupant. Then, the air bag is folded in a second direction and a counter second direction perpendicular to the first and counter first directions, and the air bag is folded in the first direction and the counter first direction. The air bag can smoothly deploy upon actuation of an air bag device, and can securely and sufficiently restrain an occupant.

8 Claims, 3 Drawing Sheets

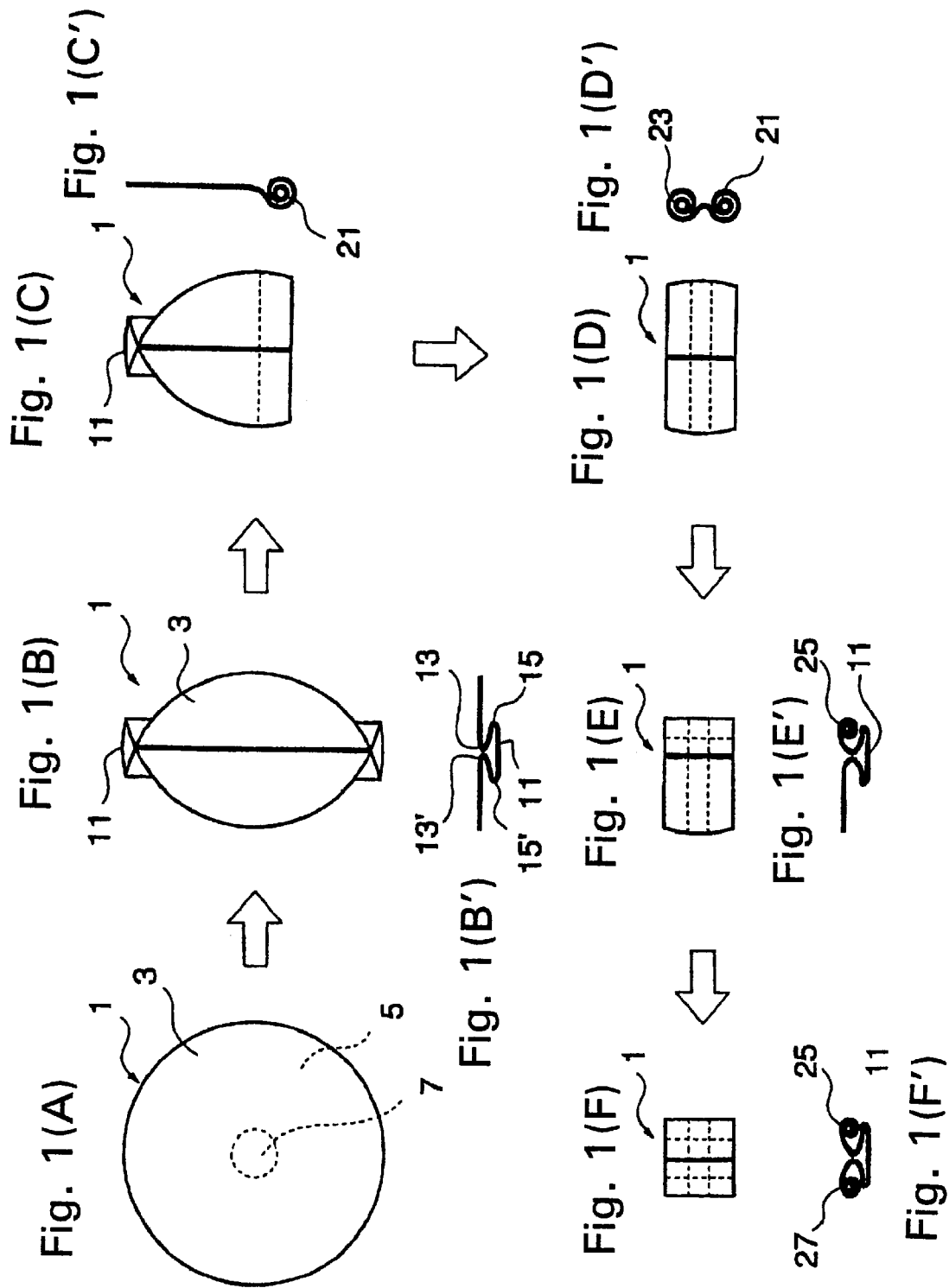

METHOD OF FOLDING AIR BAG

BACKGROUND OF THE INVENTION AND RELATED ART STATEMENT

The present invention relates to a method of folding an air bag which is deployed to protect an occupant when a vehicle comes into collision. More particularly, the present invention discloses a method of folding an air bag which can provide suitable deployment of the air bag to securely and sufficiently restrain an occupant and which is improved to provide smooth deployment of the air bag.

The present invention can be applied to any type of air bags for a driver, a front passenger and a rear passenger.

One of conventional methods of folding an air bag in which the side edges of the air bag are folded toward an occupant has the following problems. In the initial stage of the deployment, a central portion of the air bag contacting an inflator is rapidly inflated, so that a mass of folded portions is pushed out of the cover toward the occupant. In the final stage of the deployment, the air bag is inflated forward at a high speed, so that the mass of folded portions is further pushed forward. Therefore, there is a fear that the occupant is subjected to receive a pressure due to the folded portion of the air bag.

The present invention has been made in order to solve the above problem, and an object of the invention is to provide a method of folding an air bag which can provide suitable deployment of the air bag to securely and sufficiently restrain an occupant.

Another object of the invention is to provide a method of folding an air bag which is improved to provide a smooth deployment.

Further objects and advantages of the invention will be apparent from the following description of the invention.

SUMMARY OF THE INVENTION

In order to solve the above-described problems, the first aspect of the present invention provides a method of folding an air bag comprising a front panel on an occupant side and a rear panel on a side opposite to the occupant, wherein the air bag is folded by the combination of vertical, lateral and vertical directions or by the combination of lateral, vertical and lateral directions.

This enables the folded air bag to have a loosing portion in the vertically or laterally direction, thereby providing a suitable deployment of the air bag to securely and sufficiently restrain an occupant and improving the smooth deployment.

In the method of folding the air bag as mentioned above, it is preferable that side edges of the air bag are rolled up or folded in bellows on the side opposite to the occupant. The air bag can be folded in a square or rectangular shape so that the air bag can be securely accommodated in a box-like cover. In addition, the air bag is deployed relatively equally as a whole from the central portion thereof. The rolls or folded portions of the side edges of the air bag are prevented from advancing directly toward the occupant.

The second embodiment of the present invention provides a method of folding an air bag comprising a front panel on an occupant side and a rear panel on the side opposite to the occupant, which comprises (a) a step of forming a loosing portion to extend vertically or laterally about a center portion of the air bag, and (b) a step of rolling or folding like bellows upper, lower, left and right side portions of the air bag on the side opposite to the occupant.

The loosing portion in the center portion of the air bag prevents the air bag as a whole from easily rapidly projecting outwardly, so that the air bag starts to inflate from the central portion thereof gradually. The operation of the edges rolled up or folded in bellows are the same as the case of the aforementioned first embodiment.

BRIEF DESCRIPTION OF THE DRAWINGS

FIGS. 1(A)–1(F') are views illustrating one example of a folding process according to a method of folding an air bag of the present invention;

FIGS. 2(A)–2(C) are views illustrating the configurations of the air bag during the deployment in the order of time, wherein FIG. 2(A) shows a state before deployment of the air bag, FIG. 2(B) shows a state in an initial stage of the deployment, and FIG. 2(C) shows a state in a final stage of the deployment;

DETAILED DESCRIPTION OF PREFERRED EMBODIMENTS

Figure 2A:
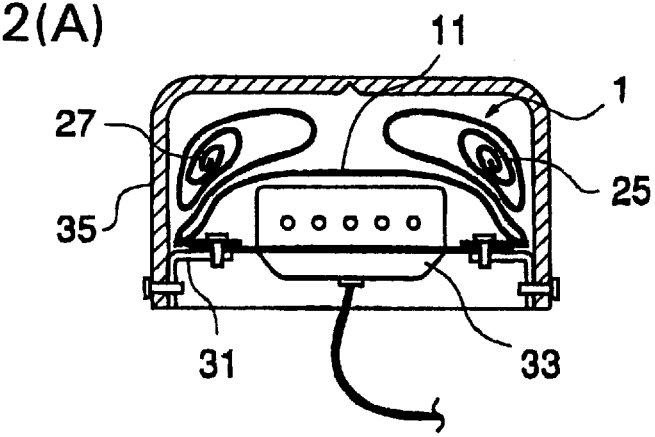

Hereinafter, the present invention will be described with reference to attached drawings.

FIGS. 1(A) though 1(F) are views illustrating the process of folding an air bag according to one embodiment of the present invention. FIG. 1(A) is view of the air bag 1, which is substantially circular in its plan view, taken at a side of a front panel 3. The air bag 1 comprises the front panel 3 and a rear panel 5 which are strongly connected to each other around the peripheries thereof, for example by sewing, adhering or welding. The rear panel 5 has a gas inlet 7 formed in the center thereof. Connected to the gas inlet 7 via a retainer 31 is an inflator 33 which generates deployment gas.

FIGS. 1(B) and 1(B'), which are a plan view and a side view, respectively, show a first stage of a folding process, wherein the air bag 1 is folded to have a loosing portion 11 vertically extending at a center area thereof. That is, two folded lines 15, 15' are set on both sides of the vertical center area of the air bag to extend parallel to each other, and the both sides of the air bag are folded along the folded lines 15, 15' toward the center of the air bag, i.e. in a first direction and a counter first direction, respectively. Then, both side portions outside of the folded lines 15, 15' are folded along folded lines 13, 13' toward the outside, i.e. in a counter first direction and a first direction, respectively. Namely, a right side of the air bag is folded in the right or counter first direction while a left side of the air bag is folded in the left or first direction. In this way, the vertically extending loosing portion 11 is formed at a side opposite to an occupant.

As shown in FIGS. 1(C), 1(C') and 1(D), 1(D'), the upper and lower side portions of the air bag 1 are rolled up on the side opposite to the occupant to form rolls 21, 23. Incidentally, FIGS. 1(C') and 1(D') are side views of FIGS. 1(C) and 1(D), respectively. As shown in FIG. 1(D'), in which the left side is the occupant side and the right side is the side opposite to the occupant, the lower roll 21 is rolled toward the center thereof in the counter-clockwise, i.e. counter second, direction and the upper roll 23 is rolled toward the center thereof in the clockwise, i.e. second, direction. This is because the air bag expands in such a manner that the center of each roll leans toward the side opposite to the occupant (see FIG. 2(C)) when the rolls become loose during the deployment of the air bag.

After that, as shown in FIGS. 1(E), 1(E'), 1(F) and 1(F'), the left and right side portions of the air bag 1 are rolled up on the side opposite to the occupant to form rolls 25, 27, so that the rolls 25, 27 are positioned on the central loosing portion 11. As a result, the air bag 1 is formed in a small square shape as shown in FIG. 1(F). In this state, the retainer 31 and the inflator 33 are connected to the air bag 11 and are accommodated in a cover 35.

Figure 2B:
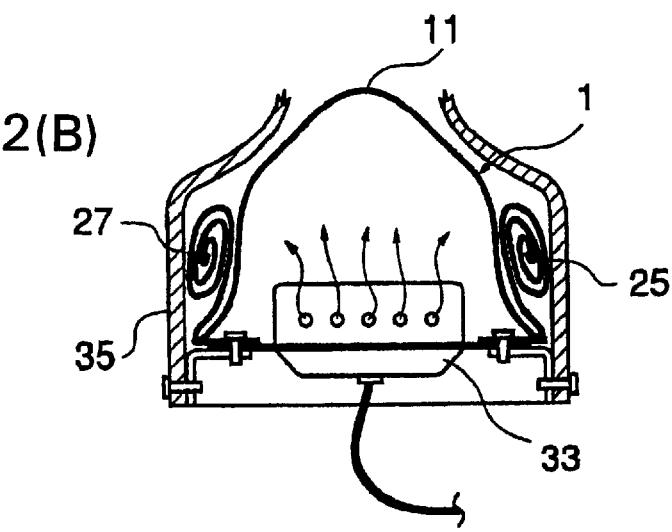
Figure 2C:
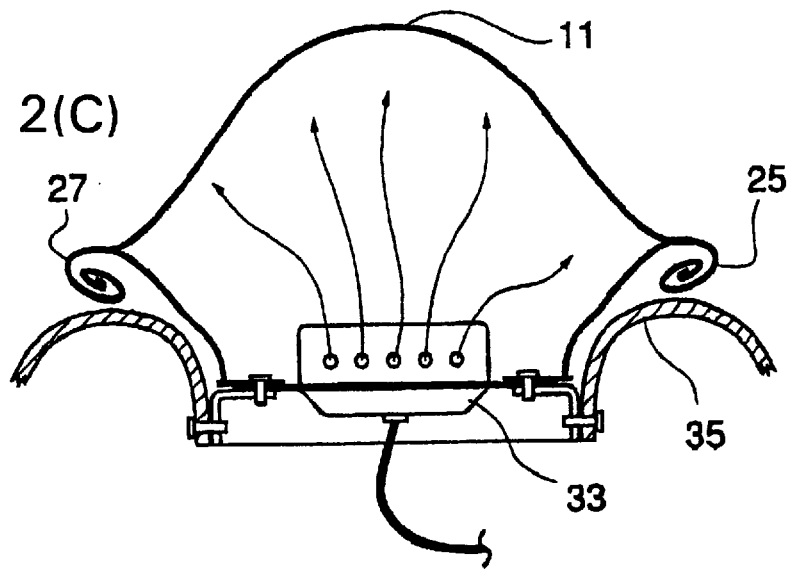

The description will be made as regard to the configurations of the air bag folded as shown in FIGS. 1(A) through 1(F') during its deployment. FIGS. 2(A) through 2(C) are views showing the configurations of the air bag of FIGS. 1(A)–1(F') in the order of time. FIG. 2(A) shows a state before deployment of the air bag, FIG. 2(B) shows a state of an initial stage of the deployment, and FIG. 2(C) shows a state of a final stage of the deployment.

In the state before the deployment shown in FIG. 2(A), the air bag 1 which is folded in a square or rectangular shape is accommodated in the box-like cover 35. The gas inlet 7 positioned toward the loosing portion 11 at the central portion of the air bag 1 is fixed to the inner periphery of the retainer 31. The inflator 33 is disposed in the center of the retainer 31.

As the inflator 33 is ignited, the loosing portion 11 at the central portion of the air bag 1 is first inflated while the side rolls 21, 23, 25, 27 still stay in the cover 35 as shown in FIG. 2(B). In the final stage of the deployment, the central portion of the air bag 1 is further inflated and the folded portions or the rolls of the side portions are accordingly inflated, so that the deployment of the air bag 1 is relatively equal and smooth, as a whole.

Hereinafter, an alternative example of the folding method according to the embodiment of FIGS. 1(A)–1(F') will be described.

Figure 3:
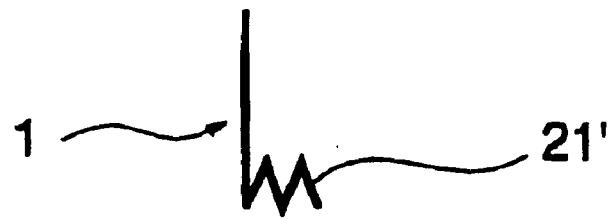
FIG. 3 is a side view showing an alternative example of the method of folding the air bag of the embodiment shown in FIGS. 1(A)–1(F')
Figure 4:
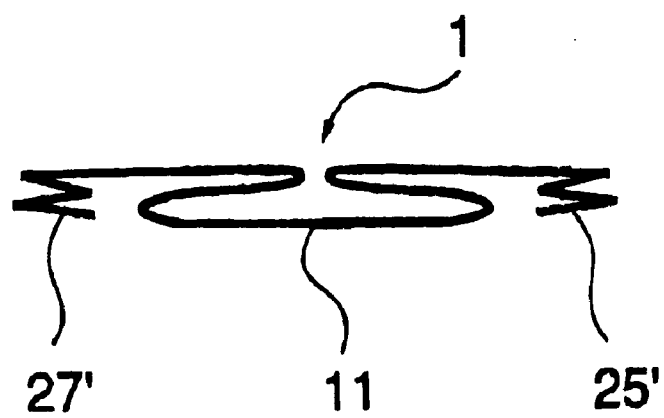
FIG. 4 is a side view showing a still alternative example of the method of folding the air bag of the embodiment shown in FIGS. 1(A)–1(F').

Though the side portions of the air bag are rolled up in the embodiment of FIGS. 1(A)–1(F'), the right and left, and upper and lower side portions may be folded in bellows 21', 25', 27', as shown in FIGS. 3 and 4.

According to the method of folding the air bag of the invention, the combination of foldings vertically, laterally and vertically or the combination of foldings laterally, vertically and laterally is employed as the folding and/or rolling directions, so that the loosing portion exists on the air bag vertically or laterally.

Since the side portions are rolled up or folded in bellows on the side opposite to the occupant, the air bag can be folded in a square or rectangular shape, so that the air bag can be securely accommodated in the box-like cover. In addition, the air bag is deployed relatively equally as a whole from the central portion thereof. The rolls or folded portions at the side portions of the air bag are prevented from advancing directly toward the occupant.

The loosing portion extending laterally or vertically across the air bag on the side opposite to the occupant prevents the air bag as a whole from easily rapidly projecting, so that the air bag starts to inflate from the central portion thereof.

As apparent from the above description, the present invention can provide a method of folding an air bag which can provide suitable deployment of the air bag to securely and sufficiently restrain an occupant and which is improved in smooth deployment.

While the invention has been explained with reference to the specific embodiments of the invention, the explanation is illustrative, and the invention is limited only by the appended claims.

What is claimed is:

1. A method of folding an air bag comprising:

forming a loosing portion at a rear side opposite to an occupant by folding the air bag in first and counter first directions, said loosing portion extending along second and counter second directions perpendicular to the first and counter first directions in a center area of the air bag, folding first edge portions of the air bag in the second and counter second directions to allow the first edge portions to be located at the rear side and to form a middle area in the center area, and folding second edge portions of the air bag in the first and counter first directions at the rear side to allow a part of the middle area to face the occupant.

2. A method of folding an air bag according to claim 1, wherein said folding the air bag includes rolling an edge portion of the air bag or turning the edge portion of the air bag in bellows.

3. A method of folding an air bag according to claim 1, wherein said loosing portion is formed by folding two sides of the air bag relative to the center area toward a front side of the air bag, and again folding the two sides to the first and counter first directions away from the center area so that parts of the two sides are placed on the center area.

4. A method of folding an air bag according to claim 2, wherein said second edge portions are located on the loosing portion.

5. A method of folding an air bag comprising:

a first folding step of folding the air bag in a first direction and a counter first direction to form a loosing portion in a center area of the air bag at a side opposite to an occupant, said loosing portion extending along a second direction and a counter second direction perpendicular to the first and counter first directions, a second folding step of folding the air bag folded in the first folding step in the second direction and the counter second direction, and a third folding step of folding the air bag folded in the second folding step in the first direction and the counter first direction, wherein said folding of the air bag includes rolling a side portion of the air bag or turning the side portion of the air bag in bellows so that the side portion is located at a side opposite to the occupant.

6. A method of folding an air bag according to claim 5, wherein in the first folding step, one side of the air bag is folded in the first direction and then folded in the counter first direction, and the other side of the air bag is folded in the counter first direction and then folded in the first direction.

7. A method of folding an air bag according to claim 6, wherein in the second folding step, parts of the loosing portion are folded in the second direction and the counter second direction.

8. A method of folding an air bag according to claim 7, wherein in the third folding step, parts of the air bag extending in the first and counter first directions are folded toward a center of the air bag.

* * * * *